United States Patent [19]

Sugasawa

[11] Patent Number: 4,652,010
[45] Date of Patent: Mar. 24, 1987

[54] ROLL-SUPPRESSIVE CONTROL SYSTEM FOR AUTOMOTIVE SUSPENSION SYSTEM WITH VARIABLE DAMPER

[75] Inventor: Fukashi Sugasawa, Yokohama, Japan

[73] Assignee: Nissan Motor Co., Ltd., Japan

[21] Appl. No.: 678,806

[22] Filed: Dec. 6, 1984

[30] Foreign Application Priority Data

Dec. 12, 1983 [JP] Japan .................... 58-234113

[51] Int. Cl.$^4$ .................... B60G 17/00
[52] U.S. Cl. .................... 280/707; 280/703; 280/714
[58] Field of Search .......... 280/707, 689, 702, 703, 280/714; 267/17 R, 19 A, 36 A, 158

[56] References Cited

U.S. PATENT DOCUMENTS

| | | | |
|---|---|---|---|
| 2,247,749 | 7/1941 | De Venel | 280/707 |
| 3,321,210 | 5/1967 | Delchev | 280/707 |
| 3,603,612 | 9/1971 | Hill et al. | 280/707 |
| 3,608,925 | 9/1971 | Murphy | 280/707 |
| 4,327,936 | 5/1982 | Sekiguchi | 280/707 |
| 4,349,077 | 9/1982 | Sekiguchi et al. | 180/41 |
| 4,555,126 | 11/1985 | Ishimitsu et al. | 280/707 |

FOREIGN PATENT DOCUMENTS

| | | |
|---|---|---|
| 56-147107 | 4/1980 | Japan . |
| 56-42739 | 4/1981 | Japan . |
| 58-30818 | 2/1983 | Japan . |
| 58-93614 | 6/1983 | Japan . |
| 0149815 | 9/1983 | Japan .................... 280/707 |
| 58-167210 | 10/1983 | Japan . |

Primary Examiner—John J. Love
Assistant Examiner—Kenneth R. Rice
Attorney, Agent, or Firm—Leydig, Voit & Mayer

[57] ABSTRACT

The stiffness of a vehicular suspension system is selected in accordance with vehicle speed and the rate of steering adjustment, which influence the centrifugal force on a turning vehicle. Shock absorbers in the suspension system can be operated in either high or low damping force modes. Vehicle speed and steering wheel position are monitored, and the latter property is checked periodically to derive a value of steering wheel acceleration. When steering wheel acceleration, i.e. the second derivative of the steering angle with respect to time, exceeds a threshold value, then shock absorbers are operated in the high damping force mode; otherwise, they operate in the low damping force mode. The threshold value to which the steering wheel acceleration value is compared is derived as a function of vehicle speed.

Pivotable, rectangular-cross-section torsion bars or other selectable-stiffness suspension elements may be used in place of the shock absorbers.

17 Claims, 12 Drawing Figures

ROLL-SUPPRESSIVE CONTROL SYSTEM FOR AUTOMOTIVE SUSPENSION SYSTEM WITH VARIABLE DAMPER

BACKGROUND OF THE INVENTION

The present invention relates generally to a control system for a variable damper in an automotive vehicle suspension system, which adjusts the damping force to be produced depending upon preselected vehicle driving conditions. More specifically, the invention relates to a suspension control system which detects vehicular steering operations and controls the damping force so as to provide the vehicle satisfactory roll-stability.

Published Japanese Patent Application (Tokkai) No. Sho. 56-42739 discloses a suspension control system which controls the damping force produced in response to rolling forces depending upon vehicle speed and steering adjustments. The damping force is so controlled as to be HIGH when the vehicle speed is higher than a set speed and the steering adjustments through greater than a predetermined angle are performed. In addition, the owner of the present application has already disclosed a suspension control system in Published Japanese Utility Model Application (Jikkai) No. Sho. 56-147107. In this system, the damping force produced by a suspension shock absorber is adjusted between HIGH and LOW levels depending upon the vehicle speed, the magnitude of steering adjustments and the angular velocity of steering adjustments.

The rolling force on the vehicle varies with the centrifugal force on the vehicle during cornering, lane changes, curves and so forth. The magnitude of the centrifugal force varies with the vehicle speed and the steering angle. Thus, the rate of change of the centrifugal force depends on the vehicle speed and rate of change of steering angle as well as the vehicle acceleration and the steering angle. For instance, when the vehicle speed is relatively low, the vehicle will tend to roll only when the rate of change of steering angle is relatively high, i.e. when the steering wheel is abruptly turned. On the other hand, when the vehicle is travelling at a relatively high speed, the rolling force on the vehicle can be quite large even in response to a relatively low rate of steering angle adjustment.

In the prior art, since the switching point of damping force between HIGH and LOW levels is determined by reference to a fixed threshold speed, the damper force will not always be suited to driving conditions. Even controlling change-over of the damping characteristics on the basis of the vehicle speed and steering angle itself may allow the damper to unnecessarily stiffen despite a small rolling moment.

SUMMARY OF THE INVENTION

Therefore, it is an object of the present invention to provide a roll-suppressive suspension control system which ensures riding comfort by avoiding unnecessary increases in the stiffness of the suspension by reference to steering behavior.

Another object of the invention is to provide a roll-suppressive suspension control system which can precisely detect steering behavior which may cause vehicular rolling.

In order to accomplish the above-mentioned and other objects, a roll-suppressive suspension control system, according to the present invention, includes a steering angle sensor producing a steering angle-indicative signal and a vehicle speed sensor producing a vehicle speed-indicative signal. The steering angular position is derived from the steering angle-indicative signals and latched at a given constant timing. Calculation period over which the rate of change of the steering angle is calculated on the basis of the latched steering angular positions is determined with reference to the vehicle speed derived from the vehicle speed-indicative signal value. A threshold value to be compared with the steering adjustment within the derived calculation period is also derived relative to the vehicle speed. The stiffness of the suspension system is normally held at a relative low level as long as the steering adjustment rate is smaller than the threshold value. The suspension system is stiffened to produce a relatively great damping force only when the steering adjustment within the derived calculation period exceeds the derived threshold value.

Determining the calculation period and the threshold value in accordance with vehicle speed enables precise detection of steering behavior which may result in vehicle rolling.

According to one aspect of the invention, a roll-suppressive damper control system for an automotive vehicle suspension comprises first means, interposed between a sprung mass and an unsprung mass of the vehicle, for producing a damping force, an actuator associated with the first means and operative between first and second positions, in the first position, the actuator operating the first means in a higher damping force mode, and in the second position, the actuator operating the first means in a lower damping force mode, first sensor for sensing angular displacement of the vehicle steering wheel and the direction to which each such displacement occurs, the first sensor producing a first sensor signal indicative of sensed steering behavior, second sensor for sensing vehicle speed and producing a second sensor signal indicative of the vehicle speed, and a controller responsive to the first and second sensor signal for deriving a control signal to operate the actuator, the controller detecting the steering angular displacement within a given period of time based on the first sensor signal, comparing detected steering angular displacement within the given period with a reference value, and deriving the control signal to actuate the actuator at the second position when the detected steering angular displacement is greater than the reference value, and the controller adjusting the duration of the given period of time on the basis of the second sensor signal value.

According to another aspect of the invention, a roll-suppressive damper control system for an automotive vehicle suspension comprises first means, interposed between a sprung mass and an unsprung mass of the vehicle, for producing a damping force against rolling moment applied to the sprung mass, an actuator associated with the first means and operative between first and second positions, in the first position, the actuator operating the first means in a HIGH mode in which a stronger damping force is produced, and in the second position, the actuator operating the first means in a LOW mode in which a weaker damping force is produced, first sensor for sensing angular displacement of a vehicle steering wheel and the direction to which each such displacement occurs, the first sensor producing a first sensor signal having a first component representative of the magnitude of the angular steering displacement and a second component indicative of the direction to which the steering wheel is displaced, second sensor for sensing vehicle speed and producing a second sensor signal indicative of the vehicle speed, and a controller responsive to the first and second sensor signals for deriving a control signal to operate the actuator, the controller sampling the first sensor signals at regular intervals to measure the angular change of the steering wheel position within each interval, the length of the interval being adjusted in accordance with the second sensor signal value, the controller producing a control signal to operate the actuator to the first position when the derived steering angular change is greater than a given value determined in accordance with the second sensor signal value.

BRIEF DESCRIPTION OF THE DRAWINGS

The present invention will be understood more fully from the detailed description given below and from the accompanying drawings of the preferred embodiments of the present invention, which however, should not be taken to limit the invention to the specific embodiments but are for explanation and understanding only.

In the drawings.

DESCRIPTION OF THE PREFERRED EMBODIMENT

Figure 1:
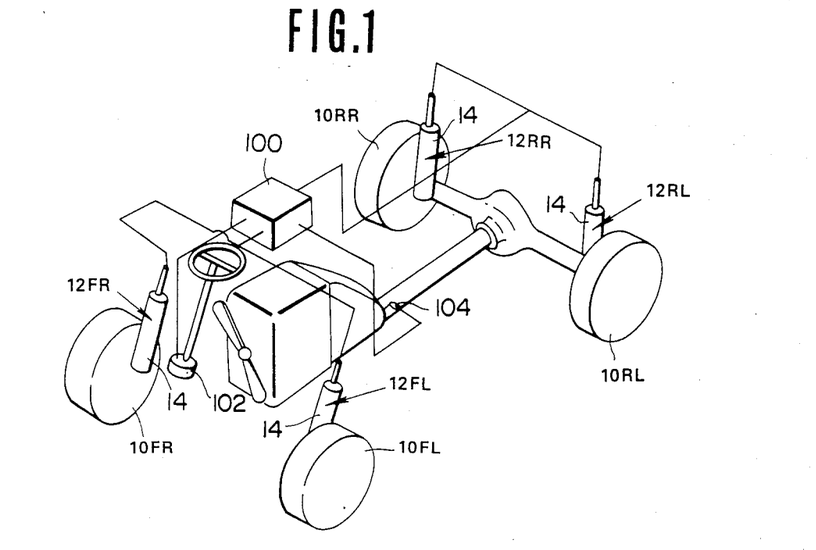
FIG. 1 is a diagram of the first embodiment of a roll-suppressive suspension control system in accordance with the present invention.

Referring now to the drawings, particularly FIG. 1, the vehicle illustrated has a strut-type suspension system for front and rear wheels. Each of the front and rear wheels $10_{FL}$, $10_{FR}$, $10_{RL}$ and $10_{RR}$ supports some of the weight of a vehicle body through suspension struts $12_{FL}$, $12_{FR}$, $12_{RL}$ and $12_{RR}$. In the shown embodiment, the front and rear suspension struts $12_{FL}$ and $12_{FR}$, $12_{RL}$, $12_{RR}$ have shock absorbers 14, which have shock-absorbing characteristics variable between HIGH and LOW levels.

Throughout the specification, the word "shock absorbing characteristics" should be understood as the ability to produce a shock-absorbing or damping force in response to relative displacement of the vehicle body, i.e. the sprung mass, and the vehicle wheel axle, i.e. the unsprung mass. In addition, "HIGH damping force" refers to the stronger of the levels of damping force or spring force produced by the shock absorber 14 and "LOW damping force" refers to the weaker level of damping or spring force produced in response to an equally strong shock.

The shock absorbers 14 thus operate in either of two modes corresponding to shock-absorbing characteristics HIGH and LOW. The shock absorbers 14 are connected to a controller 100 which selects the operation mode of the shock absorbers 14 on the basis of preselected parameters indicative of vehicle driving conditions.

In the preferred embodiment, the controller 100 detects vehicular steering operations in order to anticipate vehicle rolling. Roll-steering is due to centrifugal forces on the vehicle during travel around a corner or through a curve. The rate of change of centrifugal force, on the other hand, varies with the vehicle speed and the angular velocity of steering adjustments. Accordingly, the controller is connected to a steering angle sensor 102 which produces a steering angle-indicative signal SSt indicative of incremental changes in steering wheel position. The controller 100 is also connected to a vehicle speed sensor 104 which is mounted near a propeller shaft of the vehicle power train in a per se well-known manner. The vehicle speed sensor 104 monitors the angular speed of the propeller shaft, and projects the vehicle speed value corresponding thereto, and produces a vehicle speed-indicative signal SVs.

In general, HIGH shock-absorbing characteristic mode is selected when the magnitude of roll-steer derived from the steering angle-indicative signal value and the vehicle speed-indicative signal value is greater than a predetermined threshold value in order to ensure roll-stability. On the other hand, LOW shock-absorbing characteristic mode is selected when the magnitude of roll-steer is smaller than the predetermined threshold value to ensure riding comfort during normal vehicle operation.

Figure 2:
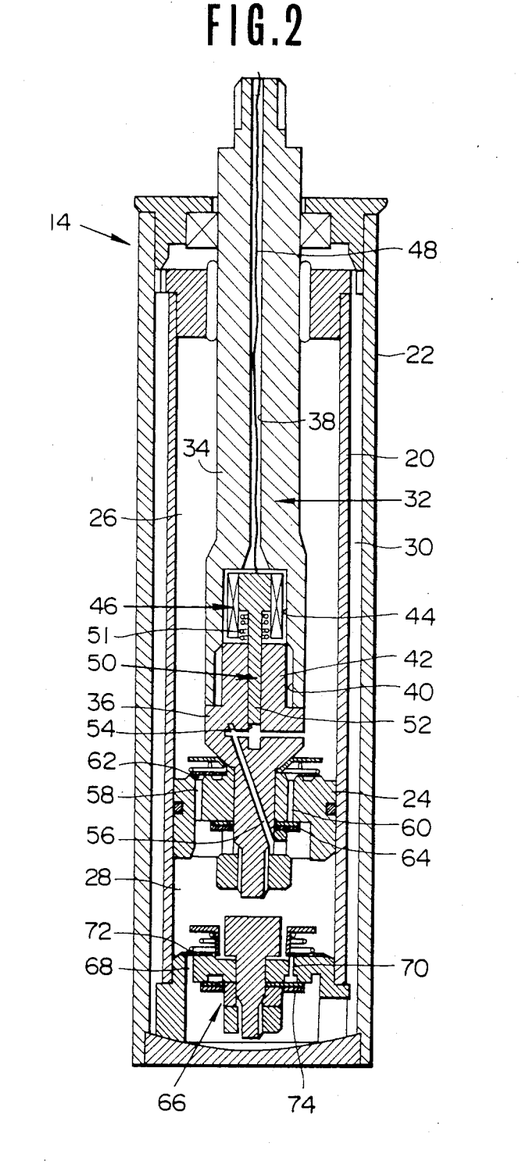
FIG. 2 is an enlarged section of a variable damping-force shock absorber utilized in the first embodiment of the suspension control system of FIG. 1

In order to allow adjustment of the shock absorbing characteristics, the shock absorber 14 employed in the preferred embodiment generally comprises inner and outer hollow cylinders 20 and 22 arranged coaxially, and a piston 24 fitting flush within the the inner cylinder 20, as shown in FIG. 2. The piston 24 defines upper and lower fluid chambers 26 and 28 within the inner cylinder 20. The inner and outer cylinders define an annular fluid reservoir chamber 30.

The piston 24 is connected to the vehicle body (not shown) by means of a piston rod which is referred to in general by the reference number 32. The piston rod 32 comprises upper and lower segments 34 and 36. The upper segment 34 has an axially extending through opening 38. The lower end of the through opening 38 opens into a recess 40 in the lower end of the upper segment 34. On the other hand, the lower segment 36 has an upper section 42 engageable with the recess 40 to define a hollow space 44. An actuator 46 is disposed within the space 44. The actuator 46 is connected to an external driver circuit 16 (FIG. 6) through a lead 48 extending through the through opening 38. The actuator 46 is associated with a movable valve body 50 which has a lower end extension 52 inserted into a guide opening 54 in the lower segment 36. The guide opening 54 extends across a fluid passage 56 passing obliquely through the lower segment 36 for fluid communication between the upper and lower fluid chambers 26 and 28.

The fluid passage 56 serves as a bypass for flow-restrictive fluid passages 58 and 60 formed in the piston 24. The upper end of the fluid passage 58 is closed by a resilient flow-restricting valve 62. Similarly, the lower end of the fluid passage 60 is closed by a flow-restricting valve 64. The flow-restricting valves 62 and 64 serve as check valves establishing one-way fluid communication in opposite directions. In addition, since the flow-restriction valves 62 and 64 are biased toward the ends of the fluid passages 58 and 60, they open to allow fluid communication between the upper and lower fluid chambers 26 and 28 only when the fluid pressure difference between the upper and lower chambers 26 and 28 overcomes the effective pressure of the valves.

The cross-sectional area of the fluid passages 58 and 60 and the set pressures of the fluid-restriction valves 60 and 62 determine the damping force produced in HIGH damping force mode. The cross-sectional area of the fluid passage 56 determines the drop in the damping force in the LOW damping force mode in comparison with that in the HIGH damping force mode.

The movable valve body 50 is normally biased upwards by means of a coil spring 51. As a result, when the actuator 46 is not energized, the lower end section 52 of the valve body 50 is separated from the fluid passage 56 to allow fluid communication between the upper and lower chamber. When the actuator 46 is energized, the valve body 50 moves downwards against the resilient force of the coil spring 51 to block the fluid passage 56 with the lower end extension 52. As a result, fluid communication between the upper and lower fluid chambers 26 and 28 via the fluid passage 56 is blocked. When fluid communication through the fluid passage is permitted, the damping force produced by the shock absorber 14 remains LOW. On the other hand, when the fluid passage 56 is shut, fluid flow rate is reduced, thus increasing the damping force produced. Therefore, when the valve body 50 is shifted to the lowered position, the shock absorber works in HIGH damping force mode to produce a higher damping force against vertical shocks.

A bottom valve 66 is installed between the lower fluid chamber 28 and the fluid reservoir chamber 30. The bottom valve 66 is secured to the lower end of the inner cylinder and includes fluid passages 68 and 70. The upper end of the fluid passage 68 is closed by a flow-restriction valve 72. The lower end of the fluid passage 70 is closed by a flow-restriction valve 74.

Figure 3:
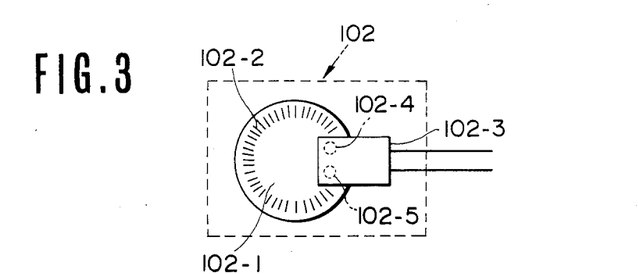
FIG. 3 is an enlarged view of a steering angle sensor employed in the first embodiment of the roll-suppressive suspension control system.
Figure 4:
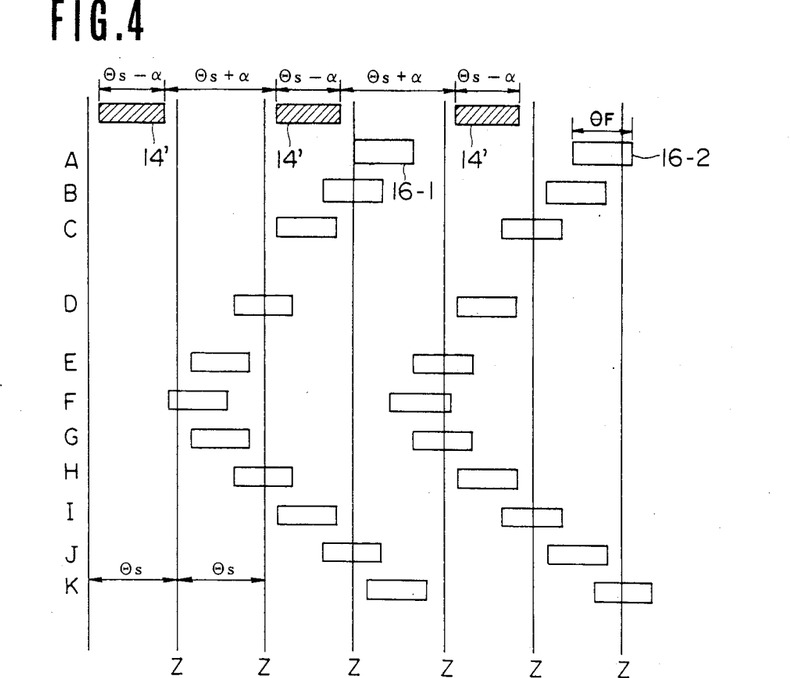
FIG. 4 is a diagram of the operation of the steering angle sensor.
Figure 5:
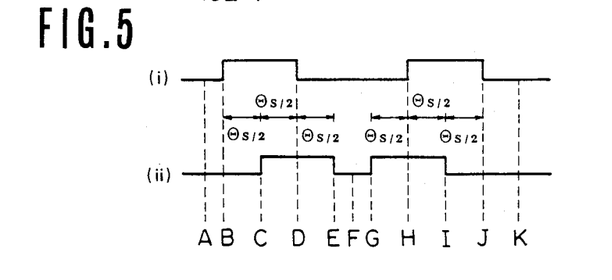
FIG. 5 is a timing chart showing how the steering adjustments are detected by the steering angle sensor of FIG. 3.

As shown in FIG. 3, a steering angle sensor 102 used in the present invention includes a disc 102-1 fixedly mounted on a steering shaft (not shown) near the steering wheel (not shown) for rotation therewith. The disc 102-1 is formed with a plurality of slits 102-2 arranged radially symmetrically about its circumference. Each slit 102-2 covers a sector ($\theta s - \alpha$) around the circumference and has an edge-to-edge separation from adjacent slits of ($\theta s + \alpha$) as shown in FIGS. 4 and 5. A photo interrupter module 102-3 scans the disc and has a pair of interrupters 102-4 and 102-5. Each interrupter 102-4 and 102-5 emits a light beam through a corresponding slit 102-6 and 102-7 which has a span $\theta_F$ on the same order of magnitude as $\theta s$ and receives the light beam passed through the corresponding slits 102-6 and 102-7 and through one of the slits of the disc 102-1. The photo interrupter module 102-3 produces two parallel pulse signals (i) and (ii) as shown in FIGS. 4 and 5. The pulse signals have a phase difference of $\theta s/2$. The rotational direction of the vehicular steering determines which of the two parallel signals (i) and (ii) leads in phase.

It should be noted that the phase separation between the photo interrupters 102-4 and 102-5 must satisfy the following expression in order to yield an angular resolution of $\theta s/2$: $(n \times \theta s + 5 \times \theta s/2; n=0, 1, \ldots)$.

In practice, the steering angle sensor 102 is adapted to output a steering angle-indicative signal pulse every 1° of steering angle variation.

This steering angle sensor is disclosed in the co-pending U.S. patent application Ser. No. 580,174, filed on Feb. 18, 1984, which corresponds to the copending European patent application No. 84101645.4, filed on Feb. 18, 1984.

Figure 6:
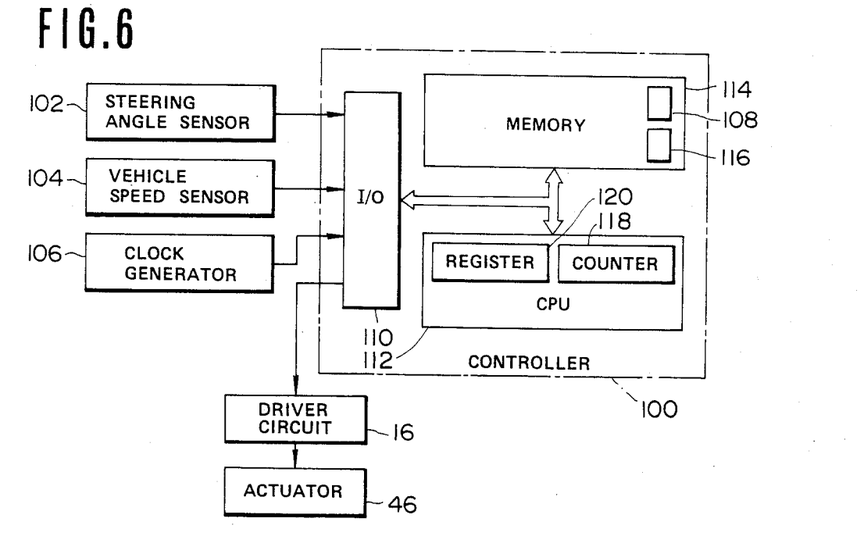
FIG. 6 is a block diagram of the first embodiment of suspension control system.

As shown in FIG. 6, the controller 100 comprises a microprocessor including a input/output interface 110, CPU 112, and a memory 114. The memory stores a table accessible in terms of the vehicle speed to derive the number of latch cycles over which changes in the steering angle position are calculated and a threshold value $\Delta \theta$ with which the steering angle change $\Delta \theta i$ is compared.

The term "latch cycle" refers to the period of sampling of the steering angle value based on the counter value of a counter 118 which is incremented by each steering angle indicative-signal pulse of one phase and decremented by the other phase of the steering angle-indicative signal. The latch cycle is a predetermined constant period of time, e.g. 20 msec. On the other hand, the period defined by the derived number of latch cycles over which the steering angle change is calculated will be referred to hereafter as "calculation period".

The controller 100 also includes a register 120 having a plurality of memory blocks $\theta 1, \theta 2 \ldots$ each of which is adapted to temporarily store the latched steering angle data. The memory blocks are so arranged as to store the steering angle data in order and when updated, erase the oldest data and shift the remaining stored values.

The I/O interface 110 enables information flow between the CPU 112 and numerous external circuits. These latter include the drive circuits 16, which are connected to receive corresponding control signals SC from the controller 100, as well as the steering angle sensor 102, vehicle speed sensor 104 and a clock generator 106, all connected for input to the CPU 112. The clock generator 106 produces a train of pulses at a fixed, high frequency which serves both as an execution trigger for CPU operations and as a timing signal.

The following table summarizes the look-up table stored in the memory block 116 of the controller in the shown embodiment:

| CALCURATION TIMING TABLE | | | | | |
|---|---|---|---|---|---|
| Vehicle Speed (Km/h) | <30 | <50 | <70 | <90 | ≧90 |
| $\Delta \theta$ | max | 50 | 10 | 8 | 6 |
| m | 0 | 12 | 4 | 4 | 4 |

In the above table, $\Delta\theta$ represents threshold values used as criteria for switching the damping mode between HIGH mode and LOW mode. The label "m" represents the calculation period, i.e. the number of latch cycles over which changes in steering angle are integrated. At vehicle speeds below 30 km/h, only the LOW damping mode is used, so the $\Delta\theta$ and m values are chosen so as to prevent selection of the HIGH mode.

The controller 100 produces a control signal SC which is indicative of the selected damping mode. In practice, the controller derives the rate of change of the steering angle on the basis of the sampled values of counter 118 over a period chosen on the basis of the vehicle speed. The controller 100 compares the derived steering adjustment rate with the threshold value $\Delta\theta$ which is also derived on the basis of the vehicle speed. HIGH mode is selected when the derived steering adjustment rate is equal to or greater than the threshold rate. Otherwise, LOW mode is selected.

Figure 7:
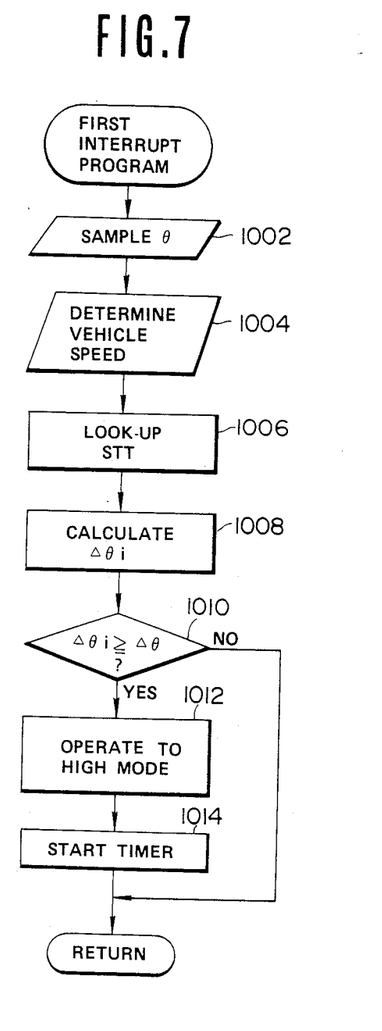
FIG. 7 is a flowchart of the first interrupt program performing suspension control according to the first embodiment of the invention.
Figure 8:
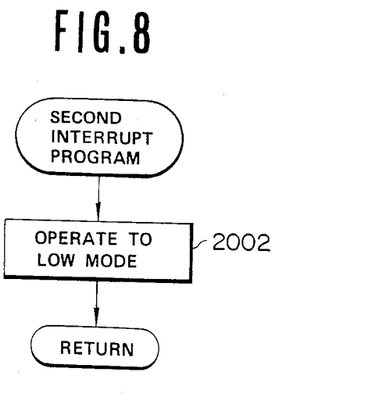
FIG. 8 is a flowchart of the second interrupt program which switches the damper from HIGH mode to LOW mode.

FIGS. 7 and 8 are flowcharts of the roll-stabilizing operation performed by the controller 100 of FIG. 6. The program shown in FIG. 7 is an interrupt program relative to the main jobs of the microprocessor and executed at regular intervals, e.g. every 20 msec. by interrupting the main job.

At the initial stage of program execution, the counter value of the counter 118 representing the steering angle is latched at a step 1002. The latched steering angle value is used to update the contents of the register 120. As will be apparent from the foregoing look-up table, as the maximum calculation period corresponds to 12 latch cycles, 12 memory blocks are provided in the register 120. Therefore, the latched steering angle value is stored in the 12th memory block $\theta12$ the previous contents of which are shifted to the memory block $\theta11$. At the same time, the steering angle value stored in the first memory block $\theta1$ is erased and replaced by the steering angle value previously stored in the second memory block 74, and similarly for $\theta2$ through $\theta11$.

After the step 1002, the interpulse interval of the vehicle speed-indicative signal from the vehicle speed sensor is measured to derive a vehicle speed value at a step 1004. Measurement of the intervals between pulses of the vehicle speed-indicative signal is performed by reference to the frequency of the clock pulse signal from clock generator 108. On the basis of the derived vehicle speed, table look-up is performed at a step 1006. The table look-up provides both the number of latch cycles defining the calculation period and the threshold value to be compared with the steering angle change within the derived calculation period. On the basis of the derived calculation period, the corresponding memory block $\theta n$ in the register 120 is accessed to yield its contents. The new steering angle value is subtracted from the accessed steering angle value $\theta n$ at a step 1008. The absolute value of the calculated steering angle change $\Delta\theta i$ is then compared with the threshold value $\Delta\theta$ at a step 1010.

If the steering angle change $\Delta\theta i$ is smaller than the threshold value $\Delta\theta$, the first interrupt program of FIG. 7 ends and control returns to the main job. On the other hand, if the calculated steering angle change $\Delta\theta i$ is equal to or greater than the threshold value $\Delta\theta$, then the control signal SC is produced to energize the magnetic coil to cause downward movement of the valve member 50 against the coil spring 51 at a step 1012. This results in closure of the fluid passage 56 between the upper and lower fluid chambers 26 and 28. As a result, the rigidity of the shock absorber 14 increases, i.e. the shock absorber starts to operate in HIGH mode. After this step, a timer 108 is started to measure elapsed time. The timer 108 outputs a timer signal after a predetermined period of time. The timer signal triggers the second interrupt program shown in FIG. 8. As will be apparent from FIG. 8, the second interrupt program is very simple, consisting essentially of one step 2002 in which the operation mode of the shock absorber 14 is switched from HIGH mode back to LOW mode. Therefore, at the step 2002, the control signal SC causing the shock absorber 14 to switch to the LOW mode is output.

In terms of practical vehicle operation, when the vehicle is at rest, there are no vehicle speed-indicative signal pulses SVs from the vehicle speed sensor 104. At the step 1002, the controller 100 reads and stores the steering angle-indicative signal SSt from the steering angle sensor 102, as the steering wheel may be turned even under these conditions. Following this, at the step 1004, the controller 100 receives the vehicle speed-indicative signal SVs from the vehicle speed sensor 104, calculates a vehicle speed value by counting the signal for a predetermined time period, and stores it as a vehicle speed, in this case zero, or simply <30 km/h. Thereafter, at the step 1006, the controller 100 selects a threshold value $\Delta\theta$ and the calculation period from the table. Since the vehicle speed is zero, the threshold value $\Delta\theta$ is set at an effectively infinite quantity to ensure a negative response at step 1010, and the calculation period is set to zero.

Subsequently, at the step 1008, the controller 100 calculates the steering angle change $\Delta\theta i$. Since, in this case, number of received steering angle pulses will generally be zero, the calculated steering angle change $\Delta\theta i$ will be zero.

Following this, at the step 1010, a determination is made as to whether or not the steering angle change $\Delta\theta i$ is equal to or greater than the threshold value $\Delta\theta$. Since, in this case, the steering angle change $\Delta\theta i$ is zero and the threshold value is great, the value $\Delta\theta i$ is less than the reference value $\Delta\theta$. Thus, the interrupt program ends. Under these conditions, the control signal SC from the interface circuit 110 is held, for example, at a logic value "ZERO" whereby the drive circuit 16 conducts no energizing current; in any case the shock absorbers 14 are held in the LOW damping-force mode. That is, in the absence of the energizing current from the drive circuit 16, the actuator 46 is held in its upper position by the force of the coil spring 51. Consequently, the fluid passage 56 is open to allow communication between the upper and lower fluid chambers 26 and 28. As a result, the shock absorbing characteristics of the shock absorber remain relatively weak.

As the vehicle starts to move from rest, the vehicle speed increases. Consequently, the vehicle speed-indicative signal SVs from the vehicle speed sensor 104 exhibits decreasing pulse intervals, in other words an increasing pulse frequency. If the vehicle is moving straight ahead, no steering angle-indicative signal SSt pulses will be received from the steering angle sensor 102. Thus, in this case the steering angle change $\Delta\theta i$ will be a small value, i.e. approximately zero. Thus, the results of execution of the step 1010 will be similar to that described when the vehicle is at rest. As a result, the shock-absorbing characteristics of the shock absorber remain LOW.

When the steering wheel is turned to adjust the steering, steering angle-indicative signal pulses will be output by the steering angle sensor 102. Of course, the selected threshold value $\Delta\theta$ and the number of latch cycles making up each calculation period decreases as the vehicle speed increases.

If the steering wheel is turned through a relatively large angle but at a relatively low steering speed, the steering angle change $\Delta\theta i$ calculated at the step 1008 will be relatively small. For this reason, the value $\Delta\theta i$ will be found at the step 1010 to be less than the value $\Delta\theta$ and the interrupt routine will end without increasing the damping force of the shock absorbers 14 to the HIGH level.

If the steering wheel is turned through a relatively small angle but at a relatively high speed, the steering angle change $\Delta\theta i$ calculated at the step 1008 will not increase rapidly even though the steering wheel is being turned rapidly. Thus, the value $\Delta\theta i$ will be found at the step 1010 to be less than the value $\Delta\theta$ and the interrupt routine will end without increasing the damping force unnecessarily.

If an abrupt steering adjustment is made at a magnitude which might cause vehicle rolling and thus the steering angle difference $\Delta\theta i$ relative to the vehicle speed exceeds the threshold value $\Delta\theta$, the program proceeds from the step 1010 to the step 1012 in which the control signal SC sent to the driver circuit 16 changes to the logic value "ONE" so as to increase the damping force of the shock absorbers 14 to the HIGH level. This causes the driver circuit 16 to conduct a predetermined energizing current to the actuator 46 of each of the shock absorbers 14 which are thereby energized to close the fluid passage 56. Consequently, the flow of fluid between the upper and lower fluid chambers 26 and 28 is restricted so as to increase the damping force produced by the shock absorbers 14. As a result, the vehicle roll-stability is increased sufficiently to suppress the roll-steer. Thereafter, at the step 1014, the timer is started.

After the predetermined period of time expires, the shock-absorbing characteristics of the shock absorber 14 will return to the LOW level upon execution of the second interrupt program of FIG. 8.

As can easily be appreciated, the magnitude of the centrifugal force on the vehicle body urging the vehicle to roll tends to be relatively great at the beginning of a curve and thereafter decreases. Rolling motion of the vehicle may be adequately suppressed by temporarily exerting greater damping force at the initial stage of such steering operations.

According to the shown embodiment, precise control of the stiffness of the vehicle suspension depending upon the roll conditions of the vehicle can be achieved by adjusting the criteria used to recognize excessive steering angular variations in accordance with the vehicle speed.

Therefore, the shock-absorbing characteristics of the shock absorber becomes HIGH only when the steering angle change $\Delta\theta i$ exceeds the threshold value $\Delta\theta$ which varies with the vehicle speed, so that the switching criteria exactly correspond to the steering conditions causing rolling motion of the vehicle.

Figure 9:
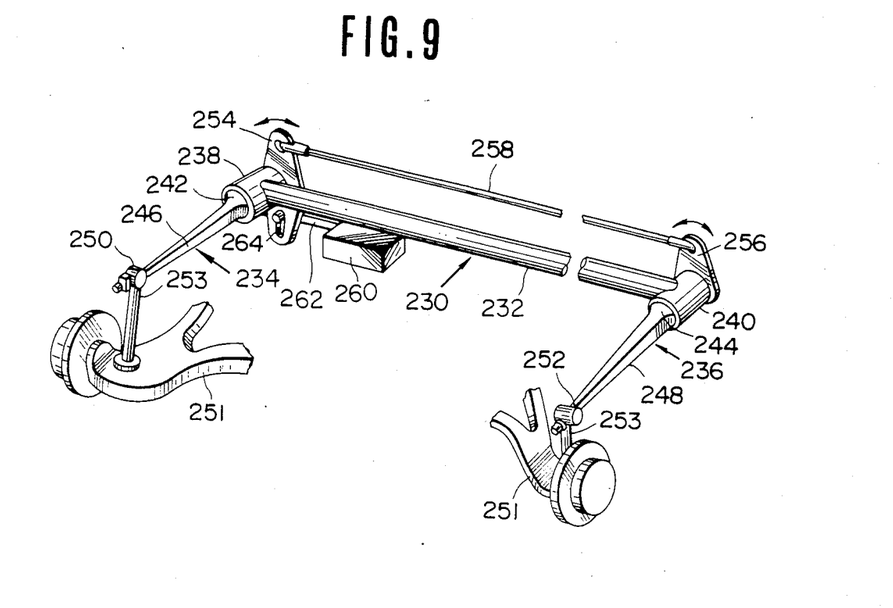
FIG. 9 is a perspective view of a stabilizer with a variable torsional modulus for suppressing rolling motion of the vehicle, which stabilizer is the second embodiment of the present invention.
Figure 10:
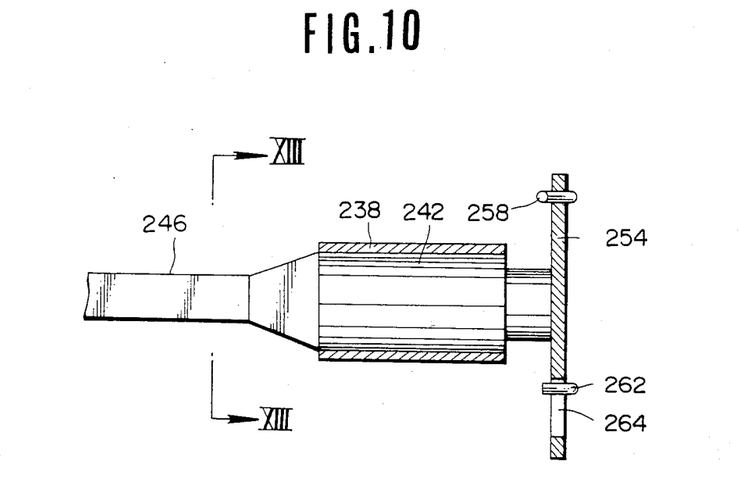
FIG. 10 is an enlarged section of a major part of the roll-stabilizer of FIG. 9.
Figure 11:
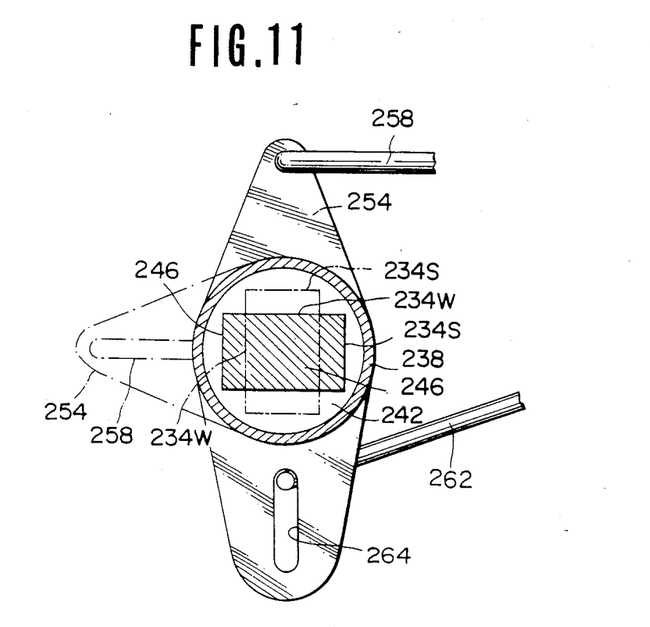
FIG. 11 is a cross-section taken along line XII—XII of FIG. 10.

FIGS. 9 to 11 show the structure of a roll stabilizer 230 to be utilized in the second embodiment. The roll stabilizer 230 comprises a transverse bar section 232 and a pair of parallel bar sections 234 and 236. The transverse bar section 232 extends essentially perpendicular to the vehicle axis and has a circular cross-section. The transverse bar section 232 is connected to hollow cylindrical bearing sections 238 and 240 at both ends. The parallel bar sections 234 and 236 have end segments 242 and 244 of circular cross-section adapted to rotatably engage the bearings 238 and 240 of the transverse bar section 232. The parallel bar sections 234 and 236 also have rectangular cross-section major sections 246 and 248, each of which has one end 250 and 252 connected to a suspension arm 251 through a connecting rod 253 which allows free rotation of the associated bar 234 or 236.

The cylindrical cross-section end segments 242 and 244 of the parallel bar sections 234 and 236 extend beyond the ends of the bearing portions 238 and 240. Link plates 254 and 256 are rigidly fitted onto the protruding ends of the parallel bar sections 234 and 236. The link plates 254 and 256 are rotatable about the bearing sections 238 and 240 together with the parallel bar sections 234 and 236. The link plates are connected to each other through a linkage 258. In addition, the link plate 254 is associated with an actuator 260 through an actuation rod 262 engaging an elongated opening 264 of the link plate 254. The actuator 260 may comprise an electromagnetically operative solenoid. The actuator is adapted to be energized by a control signal fed from a controller 100 to rotate the link plate 254 along with the parallel bar section 234 through 90° from the shown neutral position. When the actuator 260 is energized, the link plate 256 is also rotated according to rotation of the link plate 254 to pivot the parallel bar 236 through 90° within the bearing section 240.

As shown in FIG. 11, at the neutral position, the parallel bar sections 234 and 236 lie with their wider sides 234w (234w) horizontal. In this position, since the resistance of the parallel bar sections 234 and 236 to the vertical bending moment applied when the vehicle wheel bounds or rebounds is relatively small, the torsion on the transverse bar section 232 of the stabilizer 230 is small. When the actuator 260 is energized, the parallel bar sections 234 and 236 are rotated to lie with their shorter sides 234s (236s) horizontal, as shown in phantom line in FIG. 12. In this position, the bending stress on the parallel bar sections 234 and 236 is increased, i.e., the torsion on the transverse bar section 232 of the stabilizer is increase.

In this embodiment, the roll-stabilizer 30 is normally arranged so that the wider sides 234W and 236W of the parallel bar sections 234 and 236 lie horizontal. As set forth above, since the resistance of the parallel bar sections 234 and 236 to bounding and rebounding of the vehicle wheel is relatively weak in this position, the stiffness of the suspension remains low to provide good riding comfort. This roll-stabilizer 230 is held in this position as long as the steering angle change within each calculation period derived on the basis of the vehicle speed remains less than the threshold value which is also derived in accordance with the vehicle speed.

When the steering angle change matches or exceeds the threshold value, the actuator 260 is energized to rotate the parallel bar sections 234 and 236 through 90° to align the shorter sides 234S and 236S horizontally. As a result, a greater resistance is exerted against bounding and rebounding of the vehicle wheel to successfully suppress rolling motion of the vehicle body.

Therefore, controlling the stiffness of the roll-stabilizer set forth above can also achieve roll-suppressive suspension control comparable to that of the first embodiment.

Figure 12:
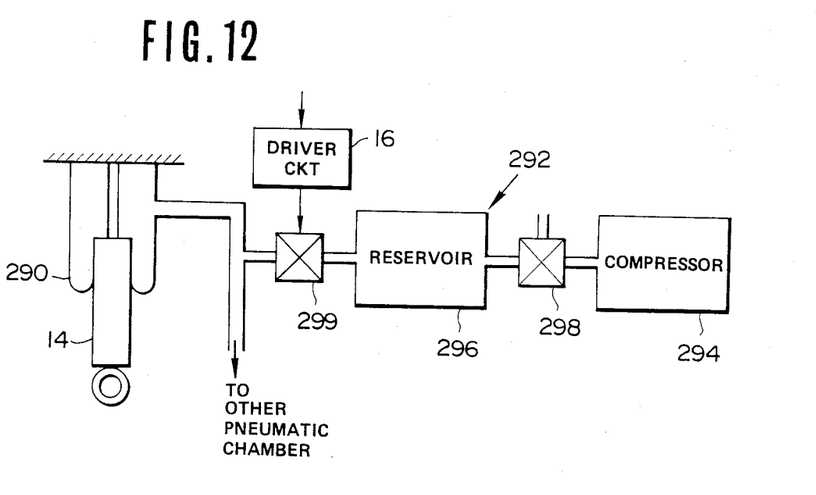
FIG. 12 is a schematic diagrammatic illustration of the third embodiment of a suspension control system according to the present invention.

FIG. 12 shows another arrangement of the automotive suspension system to which the control system according to the present invention is applicable. In the shown system, an expandable and contractable pneumatic chamber 290 is formed above the shock absorber 14. The pneumatic chamber 290 is connected to a pressurized pneumatic fluid source 292. The fluid source 192 comprises a compressor 294 for pressurizing a fluid such as air, a reservoir tank 296 connected to the compressor 294 through an induction valve 298, and a pressure control valve 299. The pressure control valve 299 connected to the driver circuit 16 to be controlled thereby. In the induction mode, the fluid reservoir 296 is connected to the compressor 292 to receive the pressurized fluid. On the other hand, the fluid reservoir 296 is open to atmosphere to decrease the fluid pressure in the ventilation mode of the induction valve.

The pressure control valve 299 is co-operative with the induction valve 298 to adjust the fluid pressure in the pneumatic chamber 290 in accordance with vehicle driving conditions.

According to the shown embodiment, the driver circuit 16 may be connected to the control system of any of the first embodiment so that it is activated in response to steering behavior. When energized by the driver circuit, the pressure control valve 299 closes to block pneumatic fluid communication between the pneumatic chamber 190 and the fluid reservoir 296. As a result, the effective volume of the pneumatic chamber 290 corresponds to that of the pneumatic chamber. Since the damping characteristics due to the pneumatic pressure in the pneumatic chamber is related to the effective volume of the pneumatic chamber and a smaller volume is achieved by blocking fluid communication between the pneumatic chamber and the fluid reservoir, the pneumatic chamber becomes relatively rigid in this case, providing a larger damping force in response to the steering behavior which causes rolling on the vehicle as detected by the manner as set out with respect to the first embodiment.

On the other hand, in the normal valve position, the pressure control valve 299 opens to establish fluid communication between the pneumatic chamber and the fluid reservoir. As a result, the effective volume becomes equal to the sum of the volumes of the pneumatic chamber and the fluid reservoir. By providing a larger effective volume, damping characteristics of the pneumatic chamber are weakened.

The above-mentioned suspension system structure of FIG. 12 has been disclosed in U.S. Pat. No. 4,349,077 to Sekiguchi et al and U.S. Pat. No. 4,327,936 to Sekiguchi. In addition, a similar system has been disclosed in the co-pending U.S. patent application Ser. No. 573,504, filed on Jan. 24, 1984, which corresponds to the co-pending European patent application No. 84100729.7, filed on Jan. 24, 1984. The contents of the above-identified U.S. Patents are hereby incorporated by reference.

Roll-suppressive control can also be achieved with this suspension system. When steering behavior which could result in rolling of the vehicle is detected, the pressure control valve 299 is closed to block fluid communication between the pneumatic chamber 290 and the reservoir in order to increase the stiffness of the strut assembly and so produce a greater damping force with which to suppress vehicle rolling. On the other hand, under normal driving conditions, the pressure control valve 299 remains open, allowing fluid communication between the pneumatic chamber and the reservoir chamber. As a result, sufficiently soft shock-absorbing characteristics can be provided to ensure good riding comfort.

As set forth above, according to the present invention, riding comfort can be provided without degrading roll-stability and drivability. Therefore, the invention fulfills all of the objects sought therefor.

What is claimed is:

1. A roll-suppressive damper control system for an automotive vehicle suspension comprising:

first means, interposed between a sprung mass and an unsprung mass of the vehicle, for producing a damping force resisting relative displacement of said sprung mass and said unsprung mass;

an actuator associated with said first means and operative between first and second positions, said actuator operating said first means in a higher damping force mode in said first position, and in a lower damping force mode in said second position;

first sensor for sensing angular displacement of the vehicle steering wheel and the direction to which said displacement occurs, said first sensor producing a first sensor signal indicative of sensed steering behavior;

second sensor for sensing vehicle speed and producing a second sensor signal indicative of the vehicle speed; and a controller responsive to said first and second sensor signal for deriving a control signal to operate said actuator, said controller including means for detecting the steering angular displacement provided by said first sensor signal within a given period of time, for comparing detected steering angular displacement within said given period of time with a reference value, for deriving said control signal to actuate said actuator at said first position when said detected steering angular displacement is greater than said reference value, and for adjusting the duration of said given period of time on the basis of said second sensor signal.

2. The damper control system as set forth in claim 1, wherein said controller further varies said reference value based on said second sensor signal.

3. A roll-suppressive damper control system for an automotive vehicle suspension comprising:

first means, interposed between a sprung mass and an unsprung mass of the vehicle, for producing a damping force resisting relative displacement of said sprung mass and said unsprung mass;

an actuator associated with said first means and operative between first and second positions, in said first position, said actuator operating said first means in a HIGH mode in which a stronger damping force is produced, and in said second position, said actuator operating said first means in a LOW mode in which a weaker damping force is produced;

first sensor for sensing angular displacement of a vehicle steering wheel and the direction to which said displacement occurs, said first sensor producing a first sensor signal having a first component representative of the magnitude of the angular steering displacement and a second component indicative of the direction to which the steering wheel is displaced;

second sensor for sensing vehicle speed and producing a second sensor signal indicative of the vehicle speed; and a controller responsive to said first and second sensor signals for deriving a control signal to operate said actuator, said controller sampling said first sensor signals at regular intervals to measure the angular change of the steering wheel position within each interval, the length of said interval being adjusted in accordance with said second sensor signal, said controller producing a control signal to operate said actuator to said first position when the derived steering angular change is greater than a given value determined in accordance with said second sensor signal.

4. The damper control system as set forth in claim 3, wherein said first means comprises a hydraulic shock absorber including a reciprocating piston and a flow-restricting valve means controlling the cross-section of a fluid passage through which working fluid of said shock absorber flows, said flow-restricting valve means being associated with said actuator to be operated to a first position in which said fluid passage is constricted when said actuator is in its first position, and otherwise to its second position in which the cross-section of said fluid passage is maximized.

5. The damper control system as set forth in claim 4, wherein said piston is connected to said sprung mass through a piston rod receiving said flow-restricting valve, said flow-restricting valve opposing a bypass passage connecting upper and lower fluid chambers defined within said shock absorber and divided by said piston which allows limited fluid communication between said upper and lower fluid chambers, said flow-restricting valve being movable between first and second positions, in the first of which said bypass passage is blocked, and at the second of which said bypass passage is open to allow easier fluid communication between said upper and lower fluid chambers, and said flow-restricting valve being operated to its first position when said actuator is in its first position and to its second position when said actuator is in its second position.

6. The damper control system as set forth in claim 3, which further comprises a timer activated in response to said control signal to measure a predetermined period of time, said timer means producing a timer signal after said predetermined period of time expires to trigger said controller to return said actuator to said second position.

7. The damper control system as set forth in claim 5, wherein said controller latches said first sensor signals at fixed intervals and selects two latched first sensor signal values to derive the magnitude of steering angular change, said two latched values being separated by a number of said fixed intervals selected in accordance with the second sensor signal.

8. The damper control system as set forth in claim 7, wherein said controller comprises a microprocessor including a memory storing a look-up table defining said number of fixed intervals accessible in terms of said second sensor signal.

9. The damper control system as set forth in claim 8, wherein said number of fixed intervals when said second sensor signal is representative of a zero vehicle speed, so that the derived magnitude of steering angular change will be zero, thus preventing change in the damping force while the vehicle is substantially at rest.

10. The damper control system as set forth in claim 8, wherein said number of fixed intervals decreases as vehicle speed increases.

11. The damper control system as set forth in claim 10, wherein said number of fixed intervals remains constant as the second sensor signal value increases beyond a given threshold.

12. The damper control system as set forth in claim 8, wherein said first means comprises a hydraulic shock absorber including a reciprocating piston and a flow-restricting valve means controlling the cross-section of a fluid passage through which working fluid of said shock absorber flows, said flow-restricting valve means being associated with said actuator to be operated to a first position in which said fluid passage is constricted when said actuator is in its first position, and otherwise to its second position in which the cross-section of said fluid passage is maximized.

13. The damper control system as set forth in claim 12, wherein said piston is connected to said sprung mass through a piston rod receiving said flow-restricting valve, said flow-restricting valve opposing a bypass passage connecting upper and lower fluid chambers defined within said shock absorber and divided by said piston which allows limited fluid communication between said upper and lower fluid chambers, said flow-restricting valve being movable between first and second positions, in the first of which said bypass passage is blocked, and at the second of which said bypass passage is open to allow easier fluid communication between said upper and lower fluid chambers, and said flow-restricting valve being operated to its first position when said actuator is in its first position and to its second position when said actuator is in its second position.

14. The damper control system as set forth in claim 8, wherein said first means comprises a stabilizer having a first essentially transverse component and a second essentially longitudinal component with an adjustable bending stress opposing the rolling moment on the sprung mass, said longitudinal component being associated with said actuator to exhibit a larger bending stress when the actuator is in said first position and to exhibit a smaller bending stress when the actuator is in said second position.

15. The damper control system as set forth in claim 14, wherein said longitudinal component has a substantially rectangular cross-section and is pivotable about its longitudinal axis, the wider side thereof lying parallel to the rolling moment when said actuator is in its first position, and the narrower side thereof lying parallel to the rolling moment when said actuator is in said second position.

16. The damper control system as set forth in claim 8, wherein said first means comprises a strut assembly including a pneumatic chamber of variable volume having first and second sections communicating for exchange of pressure through a control valve, said control valve being positioned to block communication between said first and second sections when said actuator is in said first position to limit the effective volume of the pneumatic chamber to the volume of said first section in order to produce larger damping force and to establish communication between said first and second sections when said actuator is in said second position to expand the effective volume of the pneumatic chamber to the sum of the volumes of the first and second sections in order to produce a smaller damping force.

17. A roll-suppressive damper control system for an automotive vehicle suspension comprising:

first means, interposed between a sprung mass and and unsprung mass of the vehicle, for producing a damping force;

an actuator associated with said first means and operative between first and second positions, in said first position, said actuator operating said first means in a HIGH mode in which a stronger damping force is produced, and in said second position, said actuator operating said first means in a LOW mode in which a weaker damping force is produced;

first sensor for sensing angular displacement of a vehicle steering wheel and the direction to which each such displacement occurs, said first sensor producing a first sensor signal having a first component representative of the magnitude of the angular steering displacement and a second component indicative of the direction to which the steering wheel is displaced;

second sensor for sensing vehicle speed and producing a second sensor signal indicative of the vehicle speed;

a controller responsive to said first and second sensor signals for deriving a control signal to operate said actuator, said controller sampling said first sensor signals at regular intervals to measure the angular change of the steering wheel position within each interval, the length of said interval being adjusted in accordance with said second sensor signal value, said controller producing a control signal to operate said actuator to said first position when the derived steering angular change is greater than a given value determined in accordance with said second sensor signal value; and timer means activated in response to said control signal to measure a predetermined period of time, said timer means producing a timer signal after said predetermined period of time expires to trigger said controller to return said actuator to said second position.

* * * * *